(12) United States Patent
Bauman et al.

(10) Patent No.: US 10,321,245 B2
(45) Date of Patent: Jun. 11, 2019

(54) ADJUSTABLE ELLIPTICAL POLARIZATION PHASING AND AMPLITUDE WEIGHTING FOR A HEARING INSTRUMENT

(71) Applicant: Starkey Laboratories, Inc., Eden Prairie, MN (US)

(72) Inventors: Brent Anthony Bauman, Minneapolis, MN (US); Stephen Paul Flood, Eden Prairie, MN (US); Casey Edward Murray, Apple Valley, MN (US); Beau Jay Polinske, Minneapolis, MN (US); Jay Rabel, Shorewood, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 85 days.

(21) Appl. No.: 15/071,030

(22) Filed: Mar. 15, 2016

(65) Prior Publication Data

US 2017/0272872 A1 Sep. 21, 2017

(51) Int. Cl.
*H04B 17/309* (2015.01)
*H04R 25/00* (2006.01)
(Continued)

(52) U.S. Cl.
CPC ......... *H04R 25/554* (2013.01); *H04B 7/0613* (2013.01); *H04B 7/0617* (2013.01);
(Continued)

(58) Field of Classification Search
CPC .. H04B 7/0615; H04B 7/0617; H04B 7/0619; H04B 7/10; H01Q 21/24; H01Q 21/245; H01Q 25/001
(Continued)

(56) References Cited

U.S. PATENT DOCUMENTS

| 1,792,523 A | 2/1931 | Zonel |
| 5,905,473 A | 5/1999 | Taenzer |

(Continued)

FOREIGN PATENT DOCUMENTS

| EP | 2498514 B1 | 1/2014 |
| EP | 2871859 A1 | 5/2015 |

(Continued)

OTHER PUBLICATIONS

Krieger, Kim, "Spectrum-Stretching Tunable Antennas to the Rescue", http://spectrum.ieee.org/telecom/wireless/spectrumstretching-tunable-antennas-to-the-rescue, (Feb. 22, 2013), 3 pgs.

(Continued)

*Primary Examiner* — Lee Nguyen
(74) *Attorney, Agent, or Firm* — Schwegman Lundberg & Woessner, P.A.

(57) ABSTRACT

Multiple antennas at the receiver and/or transmitter are commonly used in wireless communications systems to provide diversity in order reduce fading and other effects brought about by multi-path propagation. Due to the size of hearing aids and the wavelengths of the frequencies used for communication, it is difficult to achieve what is called spatial diversity by disposing the multiple antennas at different locations. Described herein are techniques for providing polarization diversity in hearing aids using antennas with different polarizations and applying the appropriate phase shifts to the received and/or transmitted signals to improve the signal quality.

24 Claims, 4 Drawing Sheets

(51) Int. Cl.
*H04B 7/06* (2006.01)
*H04B 7/10* (2017.01)
*H04B 17/318* (2015.01)

(52) U.S. Cl.
CPC ............. *H04B 7/10* (2013.01); *H04B 17/309* (2015.01); *H04R 2225/51* (2013.01)

(58) Field of Classification Search
USPC ............................ 455/67.16; 342/359, 361
See application file for complete search history.

(56) References Cited

U.S. PATENT DOCUMENTS

| | | | |
|---|---|---|---|
| 6,380,896 | B1 | 4/2002 | Berger et al. |
| 7,113,748 | B2 | 9/2006 | Shapira et al. |
| 7,446,720 | B2 | 11/2008 | Victorian et al. |
| 7,529,565 | B2 | 5/2009 | Hilpisch et al. |
| 7,593,538 | B2 | 9/2009 | Polinske |
| 8,036,405 | B2 | 10/2011 | Ludvigsen et al. |
| 8,121,662 | B2 | 2/2012 | Martin et al. |
| 8,180,080 | B2 | 5/2012 | Polinske |
| 8,565,457 | B2 | 10/2013 | Polinske et al. |
| 8,699,733 | B2 | 4/2014 | Polinske et al. |
| 8,902,772 | B2 | 12/2014 | Lenaerts |
| 8,923,789 | B2 | 12/2014 | Bendsen |
| 8,958,588 | B2 | 2/2015 | Müller |
| 9,191,757 | B2 | 11/2015 | Bauman et al. |
| 9,432,780 | B2 | 8/2016 | Solum |
| 9,497,553 | B2 | 11/2016 | Solum et al. |
| 9,661,427 | B2 | 5/2017 | Bauman et al. |
| 2003/0092402 | A1* | 5/2003 | Shapira ................ H04B 7/0615 455/101 |
| 2003/0179137 | A1 | 9/2003 | White et al. |
| 2010/0054512 | A1* | 3/2010 | Solum .................. H04R 25/554 381/315 |
| 2010/0120466 | A1 | 5/2010 | Li |
| 2010/0302123 | A1 | 12/2010 | Knudsen et al. |
| 2011/0019830 | A1 | 1/2011 | Leibman et al. |
| 2011/0075870 | A1 | 3/2011 | Solum |
| 2012/0002830 | A1 | 1/2012 | Solum |
| 2012/0202560 | A1 | 8/2012 | Donaldson |
| 2013/0029624 | A1 | 1/2013 | Bendsen |
| 2014/0010392 | A1 | 1/2014 | Kvist |
| 2014/0010393 | A1 | 1/2014 | Kvist |
| 2014/0270211 | A1 | 9/2014 | Solum et al. |
| 2015/0016645 | A1 | 1/2015 | Bauman et al. |
| 2015/0030190 | A1 | 1/2015 | Rabel et al. |
| 2015/0124976 | A1 | 5/2015 | Pedersen et al. |
| 2015/0131832 | A1 | 5/2015 | Jeppesen |
| 2015/0181374 | A1* | 6/2015 | Tsuda ................... H04W 4/029 455/457 |
| 2015/0304783 | A1 | 10/2015 | Haubrich et al. |
| 2016/0037270 | A1 | 2/2016 | Polinske et al. |
| 2016/0049074 | A1 | 2/2016 | Shennib |
| 2016/0057550 | A1 | 2/2016 | Shennib |
| 2016/0173998 | A1 | 6/2016 | Bauman et al. |
| 2017/0127191 | A1 | 5/2017 | Solum et al. |
| 2017/0272873 | A1 | 9/2017 | Webster et al. |

FOREIGN PATENT DOCUMENTS

| | | |
|---|---|---|
| JP | 57202146 A | 12/1982 |
| JP | 2010199661 A | 9/2010 |

OTHER PUBLICATIONS

"U.S. Appl. No. 15/071,107, Final Office Action dated Nov. 30, 2017", 13 pgs.

"U.S. Appl. No. 15/071,107, Non Final Office Action dated Jun. 29, 2017", 13 pgs.

"U.S. Appl. No. 15/071,107, Response filed Sep. 29, 2017 to Non Final Office Action dated Jun. 29, 2017", 13 pgs.

"European Application Serial No. 17161171.8, Extended European Search Report dated Jul. 11, 2017", 8 pgs.

"European Application Serial No. 17161183.3, Extended European Search Report dated Jun. 27, 2017", 11 pgs.

* cited by examiner

US 10,321,245 B2

ADJUSTABLE ELLIPTICAL POLARIZATION PHASING AND AMPLITUDE WEIGHTING FOR A HEARING INSTRUMENT

FIELD OF THE INVENTION

This invention pertains to electronic hearing aids, hearing aid systems, and methods for their use.

BACKGROUND

Hearing aids are electronic instruments that compensate for hearing losses by amplifying sound. The electronic components of a hearing aid may include a microphone for receiving ambient sound, processing circuitry for amplifying the microphone signal in a manner that depends upon the frequency and amplitude of the microphone signal, a speaker for converting the amplified microphone signal to sound for the wearer, and a battery for powering the components. Hearing aids may also incorporate wireless transceivers for enabling communication with an external device and/or communication between two hearing aids worn by a user.

DETAILED DESCRIPTION

Hearing aids may incorporate wireless transceivers that enable communication between the two hearing aids typically worn by a user. Such ear-to-ear communication provides the convenience of synchronized adjustments to operating parameters as well enabling binaural signal processing between the hearing aids. Wireless transceivers may also be used by hearing aids to enable audio streaming from external sources such as a smartphones. RF (radio-frequency) links using frequency bands such as the 900 MHz or 2.4 GHz ISM (Industrial Scientific Medical) bands may be used in hearing aids for both ear-to-ear communications and communication with external devices.

Multiple antennas at the receiver and/or transmitter are commonly used in wireless communications systems to provide diversity in order reduce fading and other effects brought about by multi-path propagation. In the case of hearing aids, for example, the presence of passive radiators in the environment, such as eyeglasses worn by a hearing aid user, may adversely affect wireless communications by a hearing aid. Due to the size of hearing aids and the wavelengths of the frequencies used for communication, it is difficult to achieve what is called spatial diversity by disposing the multiple antennas at different locations. Described herein are techniques for providing polarization diversity in hearing aids using antennas with different polarizations and applying the appropriate phase shifts and amplitude weighting to the received and/or transmitted signals to improve the signal quality.

Figure 1:
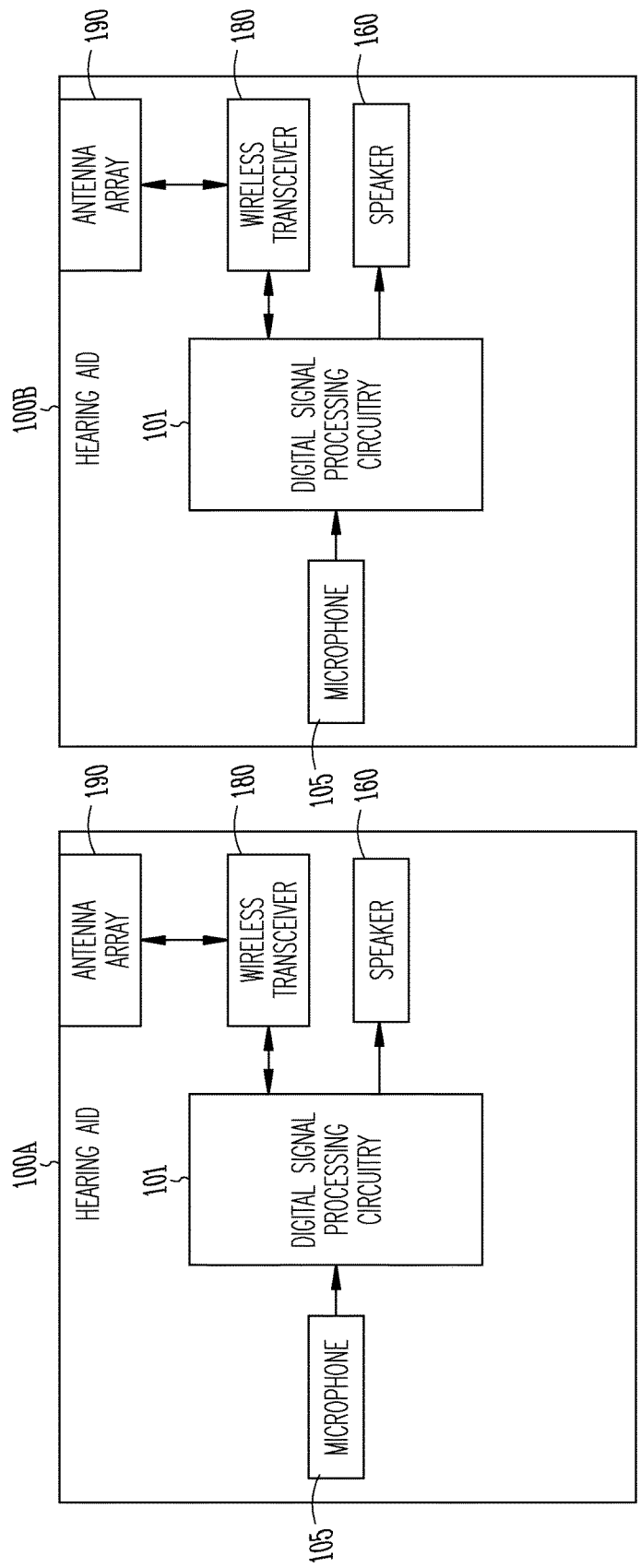
FIG. 1 shows the basic electronic components of example hearing aids.

FIG. 1 illustrates the basic functional components of an example hearing assistance system that includes hearing aid 100A and hearing aid 100B for binaural wearing by a user. The components of each hearing aid are identical and are contained within a housing that may be placed, for example, in the external ear canal or behind the ear. Depending upon the type of hearing aid, some of the components may be contained in separate housings. A microphone 105 receives sound waves from the environment and converts the sound into an input signal. The input signal is then sampled and digitized by an A/D converter to result in a digitized input signal. The device's processing circuitry 101 processes the digitized input signal into an output signal in a manner that compensates for the patient's hearing deficit. The digital processing circuitry 101 may be implemented in a variety of different ways, such as with an integrated digital signal processor or with a mixture of discrete analog and digital components that include a processor executing programmed instructions contained in a processor-readable storage medium. The output signal is then passed to an audio output stage that drives speaker 160 (also referred to as a receiver) to convert the output signal into an audio output. A wireless transceiver 180 is interfaced to the hearing aid's processing circuitry and connected to the feedpoint of antenna array 190 for transmitting and/or receiving radio-frequency (RF) signals. The wireless transceiver 180 may enable ear-to-ear communications between the two hearing aids as well as communications with one or more external devices. When receiving an audio signal from an external source, the wireless receiver 180 may produce one or more second input signals for the processing circuitry that may be combined with the input signal produced by the microphone 105 or used in place thereof.

Figure 2:
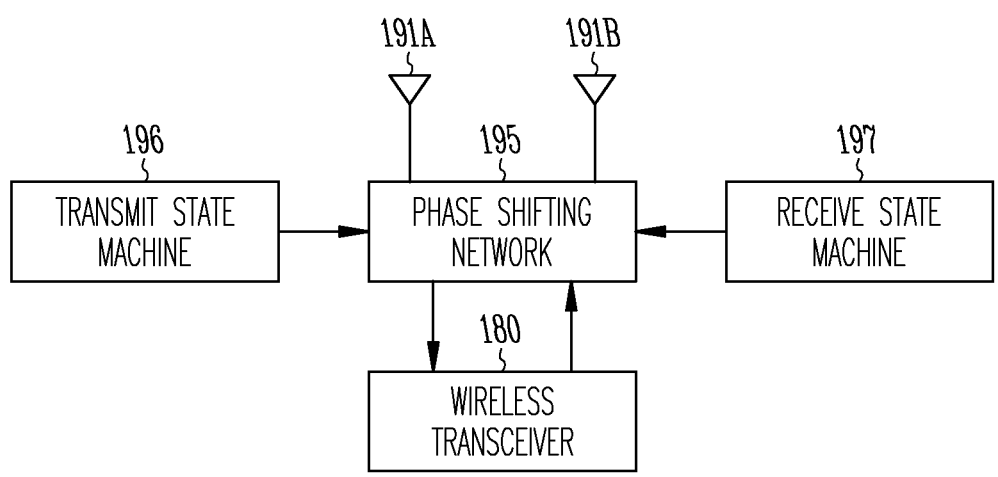
FIG. 2 illustrates an antenna array and phase shifting network.

The antenna array 190 may be designed to provide transmit polarization diversity by transmitting an elliptically polarized waveform using multiple antennas that have some degree of polarization mismatch. FIG. 2 shows an embodiment where the antenna array 190 comprises two linearly polarized antennas 191a and 191b having polarizations that are oriented perpendicular to one another. A variable phase shifting network 195 controlled by the processing circuitry 101 is disposed in the transmission line between the transceiver 180 and the antennas. During transmission, the phase shifting network 195 receives the RF signal from the transceiver and feeds each of the antennas 191a and 191b with separate signals that may be phase-shifted relative to one another. The phase shifting network 195 may also apply specific amplitude weighting to the signals fed to each antenna. By phase-shifting or time-delaying the input to antenna 191a relative to the input of antenna 191b, the shape and orientation of the ellipse and hence the polarization of the transmitted waveform may be varied. For example, if the input to one antenna is shifted by ninety degrees relative to the other and if the amplitudes of the inputs are equal, a circularly polarized waveform is produced. Other embodiments may employ other antennas and/or antenna arrangements to produce waveforms having different polarizations in order to achieve polarization diversity. Also, the amplitude weighting function of the phase shift network 195 may adjust the amplitude of each antenna independently. By shifting the amplitude scaling, an antenna that has a poor signal-to-interference-plus-noise ratio can be adjusted to minimize the degradation in performance associated with the antenna.

As noted above, transmit diversity ameliorates the problem of time-dependent fading in wireless communications, providing what is sometimes called diversity gain. Further improvements can be obtained by adjusting the phases of the signals transmitted by the differently polarized antennas to produce the strongest signal at the receiver. The optimal antenna phases will depend upon the particulars of the multipath environment such as the presence of passive radiators. Such beamforming at the transmitter produces what is sometimes called antenna gain or array gain. Beamforming can also be performed at the receiver where the signals received by the multiple antennas are combined with appropriate phase shifts in order to produce the strongest signal, referred to as maximal ratio combining (MRC). Also, in the event that the wireless received signal approaches overload, the antenna elements could be phased and amplitude-adjusted in a manner to reduce the signal strength so as not exceed the overload condition.

FIG. 2 illustrates an embodiment in which the phase shifts applied to transmitted and/or received signals by the phase shifting network 195 are controlled by a transmit (Tx) state machine 196 and a receive (Rx) state machine 197, where both state machines may be implemented by the processing circuitry. The transmit state machine controls the phase adjustments applied to the antennas during transmission, while the receive state machine controls the phase adjustments during reception. The two state machines may be designed to operate independent of one another or in a coordinated manner. The Tx state machine 196 and receive Rx state machine 197 may control the optimum phasing and amplitude weighting for each wireless connection or link that the hearing aid is using. For example, if multiple wireless links are used for wireless communication (e.g., an ear-to-ear RF link and/or multiple RF links with external devices), the Tx state machine 196 and Rx state machine 197 may control the optimum phasing and amplitude weighting for each such RF link. Also, a wireless link may have multiple RF channels, and the Tx state machine 196 and Rx state machine 197 may control the optimum phasing and amplitude weighting for each such RF channel of the link (or links in the case of multiple wireless links).

Figure 3A:
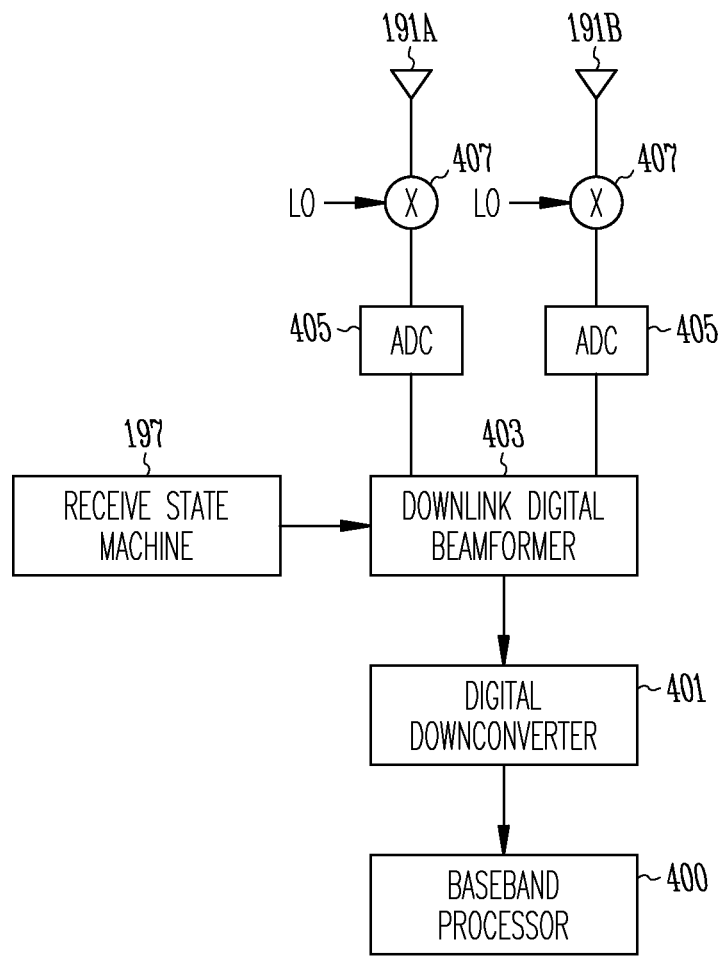
FIGS. 3A and 3B illustrate phase shifting as performed by digital beamformers.
Figure 3B:
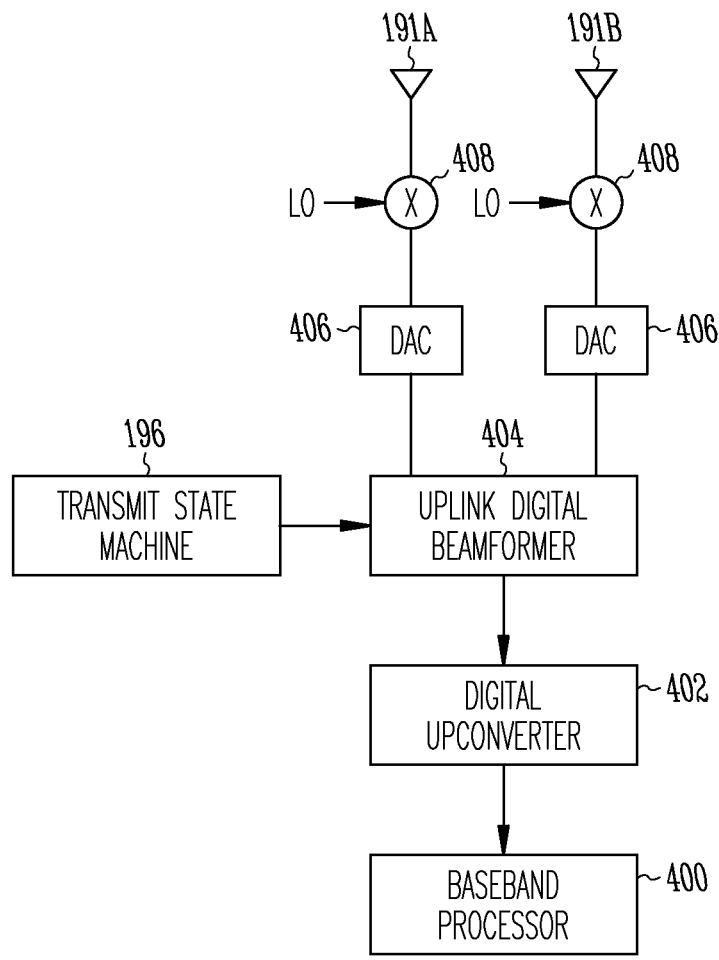

In another embodiment, rather than applying phase adjustments to the antennas in the RF domain by the phase shifting network, a digital beamformer is employed to apply phase shifts to uplink and/or downlink signals in the digital domain. The digital beamformer may operate at either baseband or at an intermediate frequency. FIGS. 3A and 3B illustrate Rx and Tx chains, respectively, of the RF transceiver in one embodiment. In FIG. 3A, signals from each of the antennas 191a and 191b are downconverted to an intermediate frequency (IF) by mixers 407 in conjunction with local oscillator signals LO and then digitized by analog-to-digital converters 405. The digitized signals are combined by downlink digital beamformer 403 in a phase-adjusted and amplitude-weighted manner as controlled by Rx state machine 197. The output of the beamformer 403 is converted to baseband by digital downconverter 401 and fed to baseband processor 400. In FIG. 3B, the output of baseband processor 400 is fed to digital upconverter 402 that upconverts the digital uplink signal to an intermediate frequency. Uplink digital beamformer 404 splits the upconverted signal for separately feeding antennas 191a and 191b in a phase adjusted and amplitude-weighted manner as controlled by Tx state machine 196. The two output signals from beamformer 404 are converted to analog by digital-to-analog converters 406 and upconverted to the RF transmit frequency by mixers 408 before being fed to antennas 191a and 191b. As with the previously described embodiment, the Tx state machine 196 and receive Rx state machine 197 may control the optimum phasing and amplitude weighting for each wireless connection that the hearing aid is using. For example, if multiple RF channels are used for wireless communication (e.g., an ear-to-ear RF link and/or multiple RF links with external devices), the Tx state machine 196 and Rx state machine 197 may control the optimum phasing and amplitude weighting for each such RF link.

In another embodiment, the uplink and downlink digital beamformers as described with reference to FIGS. 3A and 3B may operate at baseband with no conversion of the uplink and downlink signals to an intermediate frequency. In another embodiment, the uplink and downlink digital beamformers, operating at either baseband or at an intermediate frequency, may perform phase adjustments in the digital domain in combination with phase adjustments performed in the RF domain by the phase shifting network.

The receive state machine 197 may operate the phase shifting network and/or downlink digital beamformer to optimize the received signal such that it is above a desired threshold level and/or below a defined overload level. As an alternative to direct measurement of received RF signal strength, the reception of known signals from the transmission source, referred to herein as reference signals (e.g., synchronization signals and other training pilot signals), may be used to determine whether the signal strength is adequate. The performance of the received signal can be optimized by adjusting the phasing adjusting and amplitude weighting network to optimize the reception of the synchronization signal and other training pilot signals. Besides optimizing the polarization of the received signal for a given multi-path environment, such receiver beamforming may also be used to reduce interference from external sources. If an interferer exists that is degrading performance, the antennas can be phased and amplitude adjusted in a manner such that the interferer is reduced. As performance of the wireless link to the hearing aid degrades due to interference, the receive state machine can adjust the phasing of the antennas such that the antenna pattern effectively places a null in the direction of the interferer that is affecting the wireless receiver. The presence of interference may be detected in the digital domain, for example, by subtracting the known value of a reference signal from the received reference signal and measuring the residual value.

In one embodiment, the transmit state machine 196 and receive state machine 197 may monitor the packet error rate of one or more wireless links as determined by, for example, acknowledgements received from the receiver and the number of retransmission retries. If the packet error rate exceeds a predefined threshold, the transmission state machine begins adjusting the antenna phasing and/or amplitude via the phase shifting network and/or uplink digital beamformer. Once the transmissions are within desired performance targets, the transmit state machine stops further phase and/or amplitude adjustments. The transmit state machine 196 and receive state machine 197 may monitors the performance of each wireless link that the hearing instrument is in and on all RF channels employed for the wireless transmission.

In the embodiments described above, the transmit and receive state machines perform phase and amplitude adjustments to the uplink and downlink signals, respectively, to achieve a particular signal quality as determined by various criteria. The transmit and receive state machines may, when triggered by a decline in the uplink or downlink signal quality below a certain threshold, utilize a search algorithm to find phase and/or amplitude adjustments that result in the specified signal quality being met.

Example Embodiments

In an example embodiment, a hearing aid comprises: processing circuitry for processing an input signal from a microphone into an output signal for driving a speaker; a wireless transceiver connected to the digital processing circuitry; an antenna array connected to the wireless transceiver, wherein the antenna array comprises two or more antennas with different polarizations; wherein the processing circuitry further comprises a transmit state machine and a receive state machine; wherein the transmit state machine is configured to adjust the phases and/or amplitudes of uplink signals that drive the antennas in response to a degradation in uplink signal quality; and, wherein the receive state machine is configured to adjust the phases and/or amplitudes of downlink signals received from the antennas in response to a degradation in downlink signal quality. The antenna array may comprise two linearly polarized antennas having polarizations orthogonal to one another. If a single antenna is used and the polarization of the antenna is orthogonal to the polarization of the wireless link from the external device, the wireless link may be degraded significantly. By employing polarization diversity, the wireless link will not suffer the significant degradation as encountered if the wireless link suffers orthogonal polarizations.

The hearing aid in one embodiment may further comprise: a phase shifting network interposed between the transceiver and the antennas of the antenna array; wherein the phase shifting network is configured to split an RF (radio-frequency) signal from the transceiver into phase-adjusted and/or amplitude adjusted RF signals for separately driving the antennas during uplink transmission; wherein the phase shifting network is configured to combine and adjust the phases and/or amplitudes of the RF signals received from the antennas during downlink reception before passing the combined RF signal to the transceiver; and, wherein the phase and amplitude adjustments applied to by phase shifting network during uplink transmission and downlink reception are controlled by the transmit state machine and receive state machine, respectively. The amplitude weighting function of the phasing network provides further improvements to the wireless link, should a source of interference exist in one or both of the polarization channels. The phasing network is used to adjust the wireless link to provide an optimized link performance. The hearing aid in another embodiment may further comprise an uplink digital beamformer and a downlink digital beamformer that are configured to apply phase and/or amplitude adjustments to uplink and downlink signals, respectively, in the digital domain as controlled by the transmit state machine and the receive state machine. The uplink digital beamformer and downlink digital beamformer may be configured to operate at baseband or at an intermediate frequency between the RF frequency and baseband.

The processing circuitry may be configured to detect a degradation in uplink signal quality from when an packet error rate as determined from signals received from an uplink receiver exceeds a specified threshold. The processing circuitry may be configured to detect a degradation in downlink signal quality when a downlink signal strength as determined from reference signals transmitted by a downlink transmitter falls below a specified threshold. The processing circuitry may be configured to detect a degradation in downlink signal quality when a downlink signal strength as determined from reference signals transmitted by a downlink transmitter exceeds a specified threshold. The processing circuitry may be configured to detect a degradation in downlink signal quality when interference is detected in a downlink signal as determined from reference signals transmitted by a downlink transmitter. Another embodiment is a method for operating a hearing that comprises the functions performed by the processing circuitry in any of the above-described embodiments.

It is understood that digital hearing aids include a processor. In digital hearing aids with a processor, programmable gains may be employed to adjust the hearing aid output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application can be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing aid, comprising:
processing circuitry for processing an input signal from a microphone into an output signal for driving a speaker;

a wireless transceiver connected to the processing circuitry;
an antenna array connected to the wireless transceiver, wherein the antenna array comprises two or more antennas with different polarizations;
wherein the processing circuitry further comprises a transmit state machine and a receive state machine;
wherein the transmit state machine is configured to adjust the phases and amplitudes of uplink signals that drive the antennas in response to detection of a degradation in uplink signal quality detected when a packet error rate as determined from signals received from an uplink receiver exceeds a specified threshold; and,
wherein the receive state machine is configured to adjust the phases and amplitudes of downlink signals received from the antennas in response to detection of a degradation in downlink signal quality detected from reference signals transmitted by a downlink transmitter and to adjust the phases and amplitudes of the downlink signals so as to optimize reception of the reference signals.

2. The hearing aid of claim 1 further comprising:
a phase shifting network interposed between the transceiver and the antennas of the antenna array;
wherein the phase shifting network is configured to split an RF (radio-frequency) signal from the transceiver into phase and amplitude adjusted RF signals for separately driving the antennas during uplink transmission;
wherein the phase shifting network is configured to adjust the phases and amplitudes of the RF signals received from the antennas during downlink reception before combining the received RF signals and passing them to the transceiver; and,
wherein the phase and amplitude adjustments applied to by phase shifting network during uplink transmission and downlink reception are controlled by the transmit state machine and receive state machine, respectively.

3. The hearing aid of claim 1 further comprising:
an uplink digital beamformer configured to apply phase and amplitude adjustments in the digital domain to uplink signals as controlled by the transmit state machine; and,
a downlink digital beamformer configured to apply phase and amplitude adjustments in the digital domain to downlink signals as controlled by the receive state machine.

4. The hearing aid of claim 3 wherein the uplink digital beamformer and downlink digital beamformer are configured to operate at baseband.

5. The hearing aid of claim 3 wherein the uplink digital beamfoiiner and downlink digital beamformer are configured to operate at an intermediate frequency between the RF frequency and baseband.

6. The hearing aid of claim 1 wherein the processing circuitry is configured to detect a degradation in uplink signal quality when a packet error rate as determined from signals received from an uplink receiver exceeds a specified threshold.

7. The hearing aid of claim 1 wherein the processing circuitry is configured to detect a degradation in downlink signal quality when a downlink signal strength as determined from reference signals transmitted by a downlink transmitter falls below a specified threshold.

8. The hearing aid of claim 1 wherein the processing circuitry is configured to detect a degradation in downlink signal quality when a downlink signal strength as determined from reference signals transmitted by a downlink transmitter exceeds a specified threshold.

9. The hearing aid of claim 1 wherein the processing circuitry is configured to detect a degradation in downlink signal quality when interference is detected in a downlink signal as determined from reference signals transmitted by a downlink transmitter.

10. The hearing aid of claim 1 wherein the antenna array comprises two linearly polarized antennas having polarizations orthogonal to one another.

11. The hearing aid of claim 1 wherein:
the wireless transceiver is configured to operate a plurality of wireless links;
the transmit state machine is configured to adjust the phases and amplitudes of uplink signals for each wireless link; and,
the receive state machine is configured to adjust the phases and amplitudes of downlink signals for each wireless link.

12. The hearing aid of claim 1 wherein:
the wireless transceiver is configured to operate a wireless link having a plurality of RF channels;
the transmit state machine is configured to adjust the phases and amplitudes of uplink signals for each RF channel; and,
the receive state machine is configured to adjust the phases and amplitudes of downlink signals for each RF channel.

13. A method for operating a hearing aid, comprising:
operating a wireless transceiver to drive an antenna array during uplink transmission and receive signals from the antenna array during downlink reception, wherein the antenna array comprises two or more antennas with different polarizations;
operating a transmit state machine to adjust the phases and amplitudes of uplink signals that drive the antennas in response to a degradation in uplink signal quality detected when a packet error rate as determined from signals received from an uplink receiver exceeds a specified threshold; and,
operating a receive state machine to adjust the phases and amplitudes of downlink signals received from the antennas in response to a degradation in downlink signal quality detected from reference signals transmitted by a downlink transmitter and to adjust the phases and amplitudes of the downlink signals so as to optimize reception of the reference signals.

14. The method of claim 13 further comprising:
operating a phase shifting network interposed between the transceiver and the antennas of the antenna array to split an RF (radio-frequency) signal from the transceiver into phase-adjusted and amplitude-adjusted RF signals for separately driving the antennas during uplink transmission and to adjust the phases and amplitudes of RF signals received from the antennas during downlink reception before combining the received RF signals and passing them to the transceiver; and,
wherein the phase adjustments applied to by phase shifting network during uplink transmission and downlink reception are controlled by the transmit state machine and receive state machine, respectively.

15. The method of claim 13 further comprising:
operating an uplink digital beamformer to apply phase and amplitude adjustments in the digital domain to uplink signals as controlled by the transmit state; and, operating a downlink digital beamformer to apply phase and amplitude adjustments in the digital domain to downlink signals as controlled by the receive state machine.

16. The method of claim 15 wherein the uplink digital beamformer and downlink digital beamformer are configured to operate at baseband.

17. The method of claim 15 wherein the uplink digital beamformer and downlink digital beamformer are configured to operate at an intermediate frequency between the RF frequency and baseband.

18. The method of claim 13 further comprising detecting a degradation in uplink signal quality when an packet error rate as determined from signals received from an uplink receiver exceeds a specified threshold.

19. The method of claim 13 further comprising detecting a degradation in downlink signal quality when a downlink signal strength as determined from reference signals transmitted by a downlink transmitter falls below a specified threshold.

20. The method of claim 13 further comprising detecting a degradation in downlink signal quality when a downlink signal strength as determined from reference signals transmitted by a downlink transmitter exceeds a specified threshold.

21. The method of claim 13 further comprising detecting a degradation in downlink signal quality when interference is detected in a downlink signal as determined from reference signals transmitted by a downlink transmitter.

22. The method of claim 13 wherein the antenna array comprises two linearly polarized antennas having polarizations orthogonal to one another.

23. The method of claim 13 further comprising:
operating the wireless transceiver over a plurality of wireless links;
operating the transmit state machine to adjust the phases and amplitudes of uplink signals for each wireless link; and,
operating the receive state machine to adjust the phases and amplitudes of downlink signals for each wireless link.

24. The method of claim 13 wherein:
operating the wireless transceiver over a wireless link having a plurality of RF channels;
operating the transmit state machine to adjust the phases and amplitudes of uplink signals for each RF channel; and,
operating the receive state machine to adjust the phases and amplitudes of downlink signals for each RF channel.

* * * * *